United States Patent [19]

Kennedy et al.

[11] 4,410,152

[45] Oct. 18, 1983

[54] THRUST REVERSER FOR A JET ENGINE, MORE ESPECIALLY FOR EQUIPPING AN AIRCRAFT

[75] Inventors: John F. Kennedy, Boulogne; Alain Fournier, Clamart, both of France

[73] Assignee: Society De Construction Des Avions, France

[21] Appl. No.: 279,238

[22] Filed: Jul. 1, 1981

[30] Foreign Application Priority Data

Jul. 4, 1980 [FR] France .................................. 80 14907

[51] Int. Cl.³ .......................... B64C 15/00; F02K 3/06
[52] U.S. Cl. .......................... 244/110 B; 239/265.27; 239/265.19; 60/226.2
[58] Field of Search ................ 244/110 B, 15, 12.5, 244/53 R; 60/226 A, 230, 232; 239/265.27, 265.29, 265.31, 265.19, 127.3

[56] References Cited

U.S. PATENT DOCUMENTS

| | | | |
|---|---|---|---|
| 3,050,937 | 8/1962 | James et al. ...................... | 239/265.29 |
| 3,097,484 | 7/1963 | Andre et al. ...................... | 244/15 |
| 3,279,182 | 10/1966 | Helmintoller ...................... | 60/226 A |
| 3,492,821 | 2/1970 | Monaghan et al. ............ | 239/265.29 |
| 3,599,874 | 8/1971 | Horn ............................... | 239/265.29 |
| 3,601,992 | 8/1971 | Maison ............................ | 60/226 A |
| 3,605,411 | 9/1971 | Maison et al. .................. | 239/265.19 |
| 3,665,709 | 5/1972 | Medawar et al. ................ | 60/226 A |
| 3,684,183 | 8/1972 | Baerresen ....................... | 239/265.29 |
| 4,073,440 | 2/1978 | Hapke ............................ | 239/265.29 |

*Primary Examiner*—Galen L. Barefoot
*Attorney, Agent, or Firm*—Larson and Taylor

[57] ABSTRACT

The engine is of the type having a central body surrounded by a casing defining therebetween a duct for the passage of the flux. The casing comprises a fixed upstream section extended downstream by means in which are housed jacks; a downstream section movable axially to which are fixed the rods of the jacks; and an intermediate section formed of swinging doors mounted between the beams and hinged thereto by lateral pivots, each door being coupled to the mobile downstream section by means of a hinged link so that the movement of the downstream section causes the doors to swing. This type of reverser is designed more especially for turbo-fan engines having a lateral nacelle configuration in which the whole of the flux flows in the annular duct between the central body and the casing.

13 Claims, 5 Drawing Figures

Fig:3

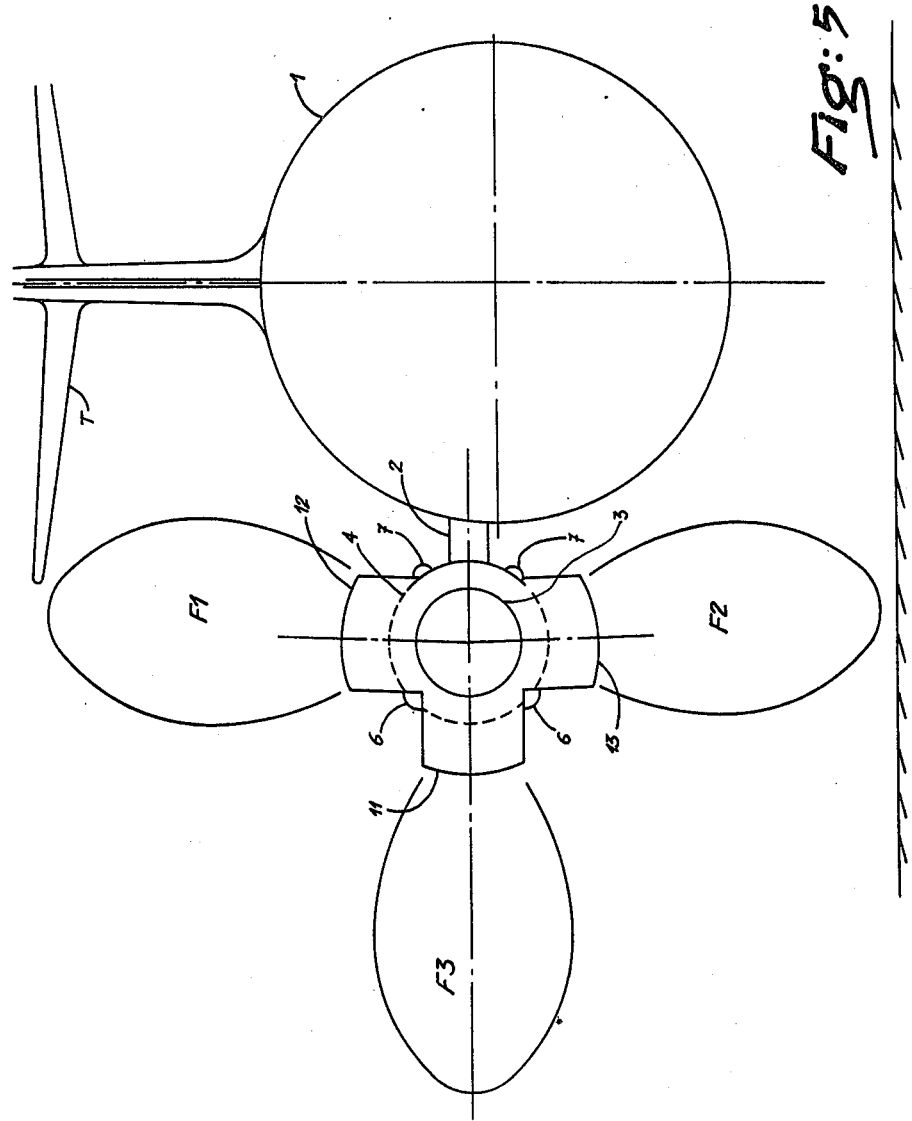

THRUST REVERSER FOR A JET ENGINE, MORE ESPECIALLY FOR EQUIPPING AN AIRCRAFT

The present invention relates to a thrust reverser for a jet engine, more especially for equipping an aircraft, said reverser being designed so as to act on the flow of a gaseous flux moving from upstream to downstream in an annular duct provided between a central structure of the engine and an outer casing which surrounds it.

Arrangements are already known in which the reversing device is formed by elements of an intermediate section of the casing situated between the upstream and downstream sections, said elements being capable of swinging from a retracted position in which they are substantially in alignment with the upstream and downstream sections, to a thrust reversal position in which they extend substantially radially with respect to the annular duct which they close off while freeing within the casing a passage for deflecting the flux radially towards the outside and upstream.

Such a device is described for example in French Pat. No. 1482538. In this document, the reversing device is formed by a series of flaps arranged in ring form and hinged to the downstream section which is fixed, their extension being provided by pivoting jacks housed in the upstream section, which is also fixed, and controlling directly the flaps.

It should be noted that, in this arrangement, we find a multiplicity of flaps which overlap and a multiplicity of flap operating members (jacks) which are placed in the deflected flow in the reversing position, which subjects them to unfavorable operating conditions.

The present invention proposes a solution for reducing the number of elements forming the reverser and the number of members for operating same, in which solution moreover no fragile part is subjected directly to the action of the deflected flow and the dynamic stresses due to the flow are transmitted to resistant structures, which ensures excellent balance and strength of the whole.

In this aspect, the invention is characterized in that the swinging elements of the reverser are doors limited in number (two, three or four), these doors being hinged to a structure integral with the fixed upstream section and coupled by hinged links to the downstream section which is axially movable, under the action of control members, with respect to the central structure, the movement of the downstream section causing swinging of the doors.

Advantageously, the doors are hinged to fixed beams situated in the extension of the upstream section and extending towards the downstream section, the control members, which may be jacks, being preferably housed in said beams which thus ensure protection thereof.

Each door link is hinged, on the one hand, to the upstream edge of the mobile downstream section and, on the other hand, to the corresponding door in a zone situated between the upstream edge of the door and the zone in which the door is hinged to the bearing beams.

Moreover, each of the doors is situated between two adjacent beams and it is hinged to each of these beams by a lateral hingeing pivot; further, each door is equipped with a single actuating link which is placed between the hingeing pivots of the door.

The reverser structure proposed above may more especially be adapted to the case of an aeroplane engine in a "lateral nacelle" configuration in which the engine is fixed by a mast to the bearing structure.

In a preferred embodiment of the invention, in such a case, the reverser will be formed by three doors one of which is practically diametrically opposite the mast and the other two are located practically symmetrically with respect to the horizontal plane passing through the axis of the engine.

The reversed jet is, for this reason, split up into three layers by means of the three doors, this solution presenting advantages in so far as the interactions with the ground and the control members of the aircraft are concerned. In fact, only about a third of the flow will be deflected towards the ground, a third upwards, the remaining third being deflected outwardly, which reduces correspondingly the problems of interaction of the deflected flow with the ground or with the control members of the aircraft.

The doors are carried by four beams which may each form a part of the wall of the casing.

So that the annular duct may be closed off in the reversing position, the rear part of each door presents, in a plane view, a concave configuration with, adjacent the hinge pivots of the door, two lateral horns extending rearwardly and a narrowed middle part, the rear curvilinear edge of the door corresponding in shape to the shape of the central body of the engine when the door is in the reversing position. Preferably, the front edge of the mobile downstream section will present a configuration corresponding to the configuration of the curvilinear rear edges of the doors, so that in the retracted position of the doors, said rear edges of the doors fit into the front edge of the mobile section, thus cooperating with the action of the jacks maintaining the doors in the closed position.

According to a particular aspect of the invention, the reversing structure described above may find any advantageous application in the case of engines in which there are produced a primary flux flow (hot) and a secondary flux flow (cold) by means of a frontal blower or fan, these two flows being ejected through the single annular duct provided between the central body and the casing, the reverser of the invention, in this case, causes the diversion of practically the whole of the flows created by the engine and the blower. The simplicity and the strength of the reverser of the invention are particularly well adapted to such a case for no fragile part (control jack or hinge pivot) is in contact with the deflected flow which is at a high temperature.

Other characteristics and advantages of the present invention will appear in the following description of an embodiment of the reverser with reference to the accompanying drawings in which:

FIG. 5 is a diagram of a "lateral nacelle" configuration engine mounted in an aircraft fuselage and showing how the flux is distributed in the thrust reversal position.

Although the invention may apply to different types of engine, in the description thereof which follows, there will be described by way of non limiting example a reverser for fitting to a turbo-fan aircraft engine according to a "lateral nacelle" configuration.

Figure 1:
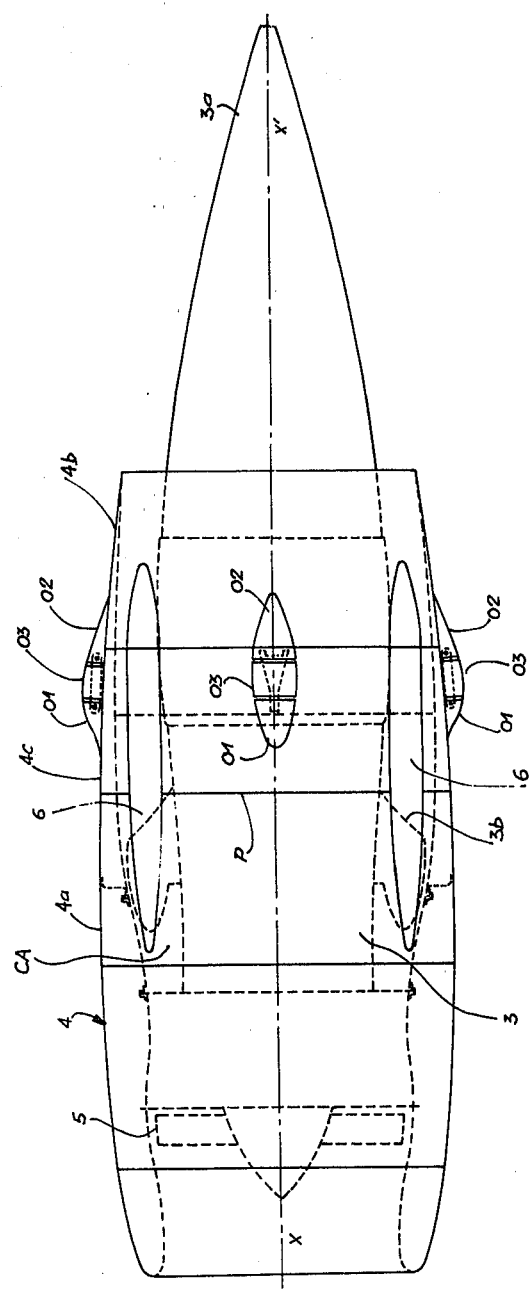
FIG. 1 is a schematic elevational view of an engine fitted with a reverser in accordance with the invention shown in the retracted position.

As can be seen in FIG. 5, engine 3 is conventionally fixed to the fuselage 1 of the aircraft by means of a nacelle mast 2, the engine being surrounded by a tubular casing designated generally at 4. As shown in FIG. 1, a forward fan or blower is associated with the reactor which, in the example shown, is of a special type in which the rear portion forms a closed voluminous central body of great length 3a in which are housed the high pressure turbine, the combustion chamber and all the fittings of the engine. The primary hot flux is ejected by peripheral nozzles 3b opening into the annular duct CA provided between the outer wall of engine 3 and casing 4 and which also serves for the flow of the secondary flux coming from the fan.

In accordance with the invention, casing 4 is formed of three sections, namely a fixed upstream section 4a which surrounds the fan and the front of the engine, a downstream section 4b, or shroud, which is mobile in axial translation and an intermediate section 4c comprising swinging doors forming the deflector mechanism.

On the external wall of the fixed section 4a are provided four fixed beams 6 and 7 extending parallel to the axis of the engine and beyond plane P defining the section 4a and 4c. The two beams 7 (see FIG. 3) are situated on each side of the nacelle mast 2, whereas the two beams 6 are disposed opposite.

In each of the beams there is housed a jack V, the free end of the rod 8 of which is hinged at 9 to the front structure 10 of the mobile shroud 4b, the movement of the jacks moving the shroud along the longitudinal axis X-X' of the engine.

In cross section, said shroud 4b has substantially a C shaped section, its free edges being engaged in longitudinal slides (not shown) provided in the fixed structure of the nacelle mast and providing guide means for the shroud during movement thereof.

Between the four beams 6–7 are mounted three doors 11–12 and 13 which, in the example shown, have the general shape of a truncated cone portion. Each door 11–12 and 13 is hinged by means of two lateral pivots 14 to the two adjacent beams, door 11 being hinged between the two beams 6 and doors 12 and 13 respectively between a beam 7 and a beam 6 (see FIG. 3). The two pivots of each door are aligned along the same geometrical axis and all the geometrical hingeing axes of the doors are situated in the same plane perpendicular to the axis X-X'' of the engine.

Figure 2:
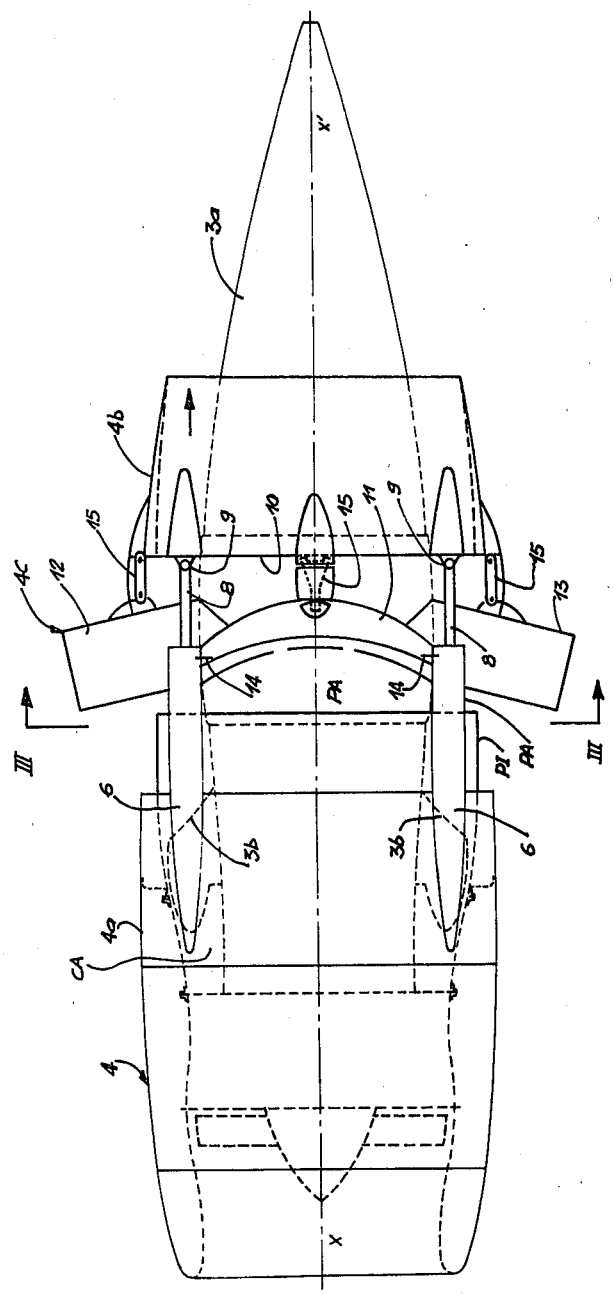
FIG. 2 is a view similar to FIG. 1 showing the reverser in the extended position.

It will be noted, as can be seen especially in FIG. 2, that pivots 14 are in the immediate vicinity of the rear end of beams 6–7.

Each door is further coupled to the mobile shroud 4b by means of a link 15 disposed in a radial plane of the engine and in the middle zone of the door. This link 15 is hinged at 16 to lugs 23 integral with the external face of the door and at 17 to lugs 35 provided on the front structure of the forward edge 10 of the shroud. The hinge axis 16 of the link is situated between the upstream edge of the door and the pivots 14 hingeing the door to the supporting beams. In the example shown, since links 15 project outwardly, they may be covered, for aerodynamic reasons, with a fairing formed of shells 01, 02 and 03, shell 01 being fixed to the door, shell 03 to the link and shell 02 to the shroud 4b. The shells are free with respect to each other so as to allow their relative movement during movement of the doors and of the shroud.

The door comprises an outer curved wall 20 in the rear part of which are fixed transverse frames 22 and 24 made from sheet metal bent into a U shape which provide rigidity at the rear edge of the door. On rear frame 24 there is also fixed a mounting 25 which, in the retracted position of the door (FIG. 4), is located under the hinge 17 between the link and shroud 4b and crushes a seal 36 fixed to the front face 10 of the shroud, this seal 36 sealing the rear of the door.

Inside frames 22 and 24 there is fixed an internal wall 26 whose rear end covers mounting 25 to which it is fixed at 30. The internal wall 26 is fixed, at the front of the door, against the external wall 20 by means of a front frame 27 projecting inwardly of the door and forming a tongue providing additional deflection of the deflected flux when the door is open. Sealing at the front of the door in the retracted position is provided by a seal 28 fixed to the front of an internal wall PI integral with the fixed section 4a and extending it downstream, seal 28 being crushed by the internal wall 26 of the door when this latter is retracted. The position of seal 28 prevents any leak of flux towards the front of the doors when they are retracted.

Figure 4:
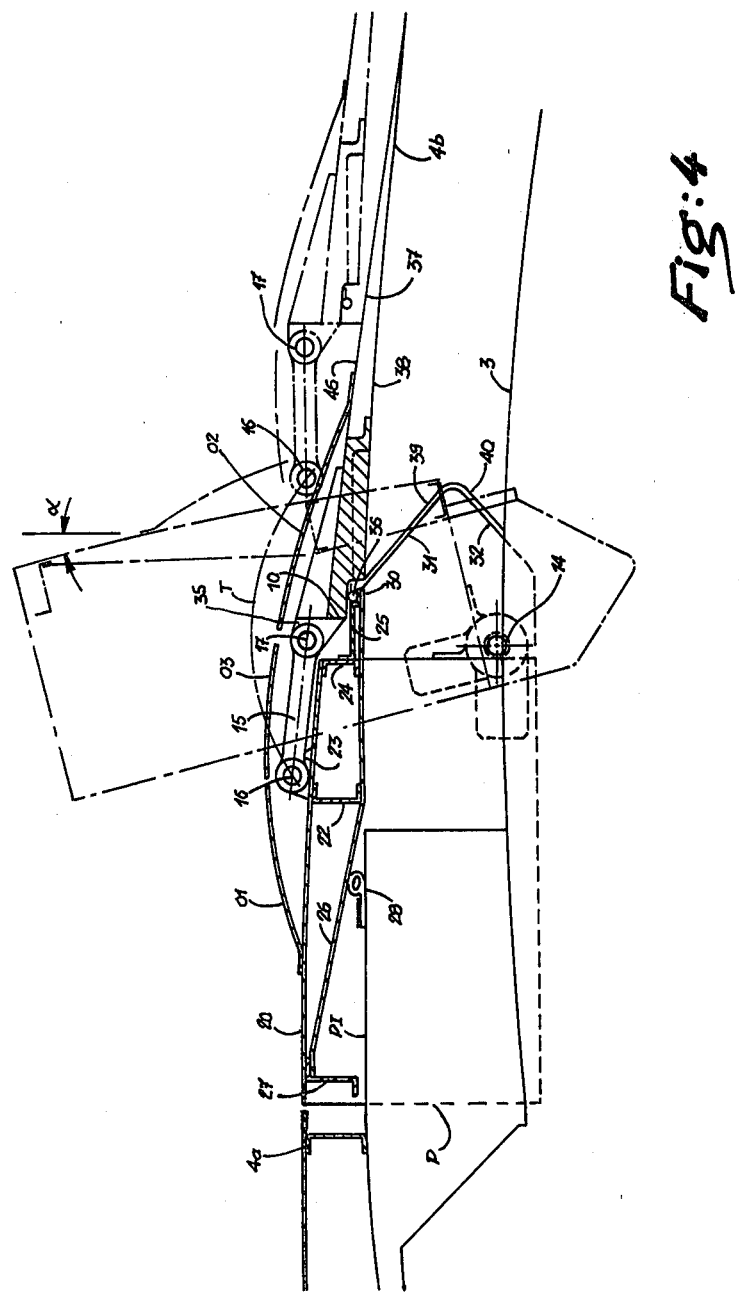
FIG. 4 is a detail in longitudinal section of a door shown in the retracted position with a continuous line and in the extended position with a broken line.

As can be seen in FIG. 4, the arrangement of the door is preferably such that in the retracted position the plane of pivots 14 hingeing the doors to the beams is located between pins 16 and 17 hingeing the links to the door and to the shroud. Moreover, the hingeing point 16 of the link to the door is situated at a distance from the downstream edge of the door such that, when the door is in the thrust reversing position shown with a broken line in FIG. 4, hingeing point 16 is substantially at the same distance from the axis of the engine as the hingeing point 17 of the link to shroud 4b.

There is shown at T the path of pin 16 and it can be seen that this path moves very little away from the generatrix of the casing, which means that links 15 will always, during operation, be in a substantially horizontal position.

As was mentioned above, each of the doors extends on each side of the hinge zone 14 to the beams. There will now be described more especially the rear part of the doors which closes off the annular duct between engine and casing during thrust reversal.

Seen in a top view (see FIG. 3) the rear part of the door is substantially crescent shaped with a curvilinear end edge 31 having the exact shape of a fraction of the external wall of the engine.

Figure 3:
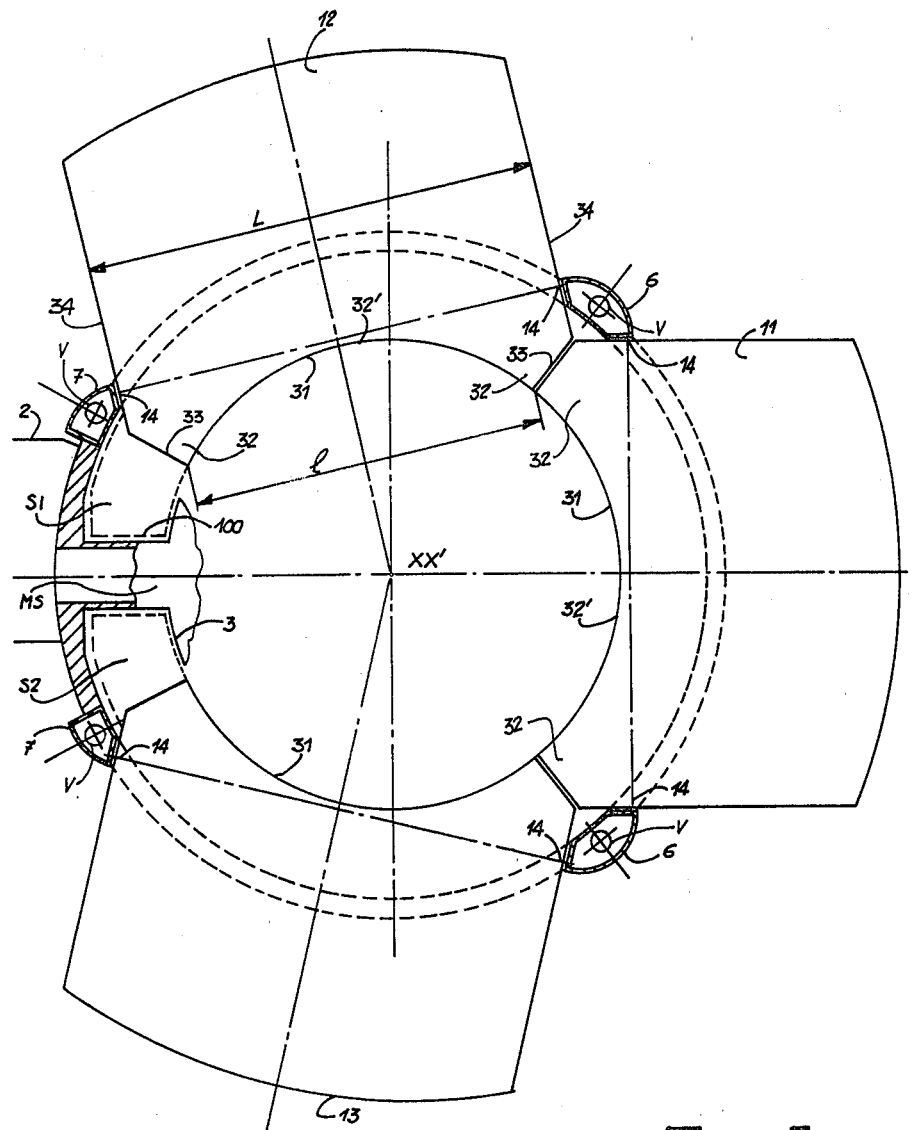
FIG. 3 is a schematical cross-section along line III—III of FIG. 2.

This rear part comprises, in the vicinity of the hinge pivots 14, two lateral horns 32 extending rearwardly in the retracted door position, and a narrowed middle part 32'. The distance "1" measured between the lateral horns is less than the width "L" of the door, said horns being connected to the lateral parallel edges of the door by parts 33 converging towards the axis of the door. As can be seen in FIG. 3, in the open position of the doors, the parts 33 of the adjacent doors come opposite one another under beams 6 so as to provide optimum closing off of the annular duct. With the above described shape for doors 12 and 13, in the open position of the doors, there remain non-closed off spaces $S_1$ and $S_2$ on each side of the engine supporting mast MS connecting the engine 3 to mast 2. Under certain circumstances, it may be necessary to maintain such spaces $S_1$ and $S_2$ of duct CA not closed off. However, it is desired that the duct be closed off as completely as possible, it would be possible, as a variation, to fix to the horn 32 of doors 12 and 13 the closest to mast MS, an extension blade which is shown schematically with a borken line at 100, this blade extending to the immediate vicinity of support mast MS.

The structure of shroud 4b will also be described rapidly. This shroud comprises an external wall 37 and an internal wall 38 connected together at the front by a front beam which forms edge 10.

The front edge of wall 38 is cut out so as to present a configuration corresponding to the configuration of the curvilinear rear edges 31-32 of the doors. In this respect, at each door, the edge of wall 38 has an indented shape 39-40 in which the rear of the door fits in the retracted door position shown in FIG. 3. This fitting together of the complementary shapes of edges 31-32 and 39-40 cooperates in maintaining the doors in the closed position.

The operation of the reverser is very simple. In normal flight, the actuating jacks of the shroud are retracted and the shroud occupies the position shown with a continuous line in FIGS. 1 and 4. The three doors are folded back in the retracted position and the continuous internal wall of the casing is formed by an internal wall PI extending the fixed section 4a beyond the junction plane between 4a and 4c, by wall 26 of the doors and by wall 38 of the shroud.

To open out the reverser, the shroud jacks are operated which push this latter rearwardly. Links 15 then cause the doors to swing and open into the position shown by a broken line, i.e. with an upstream slope "α" with respect to a vertical plane. Passages PA having a substantially rectangular shape (FIG. 2) are then provided between the doors and the edge of the extension PI, through which passages the primary and secondary flux flows are deflected outwardly and upstream.

As can be seen more especially in FIG. 5, the three doors of the reverser cause the flux to split up into three layers $F_1$ $F_2$ and $F_3$. Since a third of the flux is thrown back by door 11 laterally towards the outside, the size of layer $F_1$ (deflected upwards in the vicinity of the directional structures T of the apparatus situated at the rear) as well as the size of layer $F_2$ (deflected towards the ground and capable of creating unfavorable interactions between the ground and the fuselage 1) are correspondingly reduced, which substantially reduces the disadvantages related to the disposition of layers $F_1$ and $F_2$.

We claim:

1. A thrust reverser for a jet engine comprising an outer casing surrounding an engine structure and defining therewith an annular duct for the flow of a gaseous flux from an upstream region to a downstream region, said casing comprising a fixed forward section and a moveable downstream section which is axially moveable with respect to said engine structure; means for producing a thrust inversion comprising doors moveable from a first, inactive position to a second, thrust reversal position in which the doors extend radially with respect to the annular duct so as to close off the duct and extend outwardly with respect to the casing so as to create a passage in the casing which allows the flux to be deflected radially towards the outside of the annular duct and upstream thereof, said doors forming an intermediate section of the casing which is located between said fixed forward section and said moveable downstream section and which, in the first, inactive position thereof, is co-planar with said upstream and downstream sections; exterior links for joining said doors to said downstream section of said casing; beams forming extensions of said fixed upstream section of said casing and disposed laterally with respect to said doors; fixed axes formed integrally with said beams about which said doors pivot between said inactive position and said thrust reversal position; and control means for moving said downstream section of said casing and comprising jacks which are housed in said beam and which extend between said fixed upstream section and said moveable downstream section such that the action of said jacks directly causes the axial movement of said moveable downstream section and, consequently, the pivoting of said doors to said second, thrust reversal position thereof, solely by means of the force exerted by said moveable sections on said links and such that said jacks are permanently disposed outside of the thrust inversion flux.

2. The thrust reverser as claimed in claim 1, characterized in that each door is pivoted on each side about said pivot axes and said beams are integral with the upstream section.

3. The thrust reverser as claimed in claim 1, characterized in that each link is hinged, on the one hand, to the upstream edge of the moveable downstream section and, on the other hand, to the corresponding door in a zone situated between the upstream edge of the door and the pivot axes of the door, to structure integral with the upstream section.

4. The thrust reverser as claimed in claim 1, characterized in that each door is coupled to the moveable downstream section by means of a single said link situated between the pivot axes of the door.

5. The thrust reverser as claimed in claim 1 adapted to an aeroplane engine having a "lateral nacelle" configuration in which the engine is fixed by a mast to the bearing structure, characterized in that said reverser comprises three said doors one of which is disposed almost diametrically opposite the mast and the other two are situated almost symmetrically with respect to a horizontal plane passing through the axis of the engine.

6. The thrust reverser as claimed in claim 5, characterized in that the doors have a generally rectangular and curved shape.

7. The thrust reverser as claimed in claim 5, characterized in that the doors are carried by four beams, two of these beams being situated respectively in the vicinity of the mast and the other two being disposed respectively between two adjacent doors.

8. The thrust reverser as claimed in claim 7, characterized in that each door forms a part of the wall of the casing.

9. The thrust reverser as claimed in claim 5, characterized in that the rear part of the door extending between the pivot axes and the moveable downstream section presents, in a plane view, a concave configuration with, in the vicinity of the pivot axes of the door, two lateral horns extending rearwardly and a narrowed middle part, the rear curvilinear edge of the door corresponding exactly to the shape of the central structure of the engine when the door is in the reversal position.

10. The thrust reverser as claimed in claim 9, characterized in that the distance measured between the lateral horns is less than the width of the door, the horns being connected respectively to the lateral corresponding edge of the door by means of parts converging rearwardly and towards the axis of the door.

11. The thrust reverser as claimed in claim 9, characterized in that the front edge of the moveable downstream section presents a configuration corresponding to the configuration of the curvilinear rear edges of the doors so that in the inactive position of the doors, said rear edges of the doors fit into the front edge of the moveable section, thus cooperating in maintaining the doors in the inactive position.

12. The thrust reverser as claimed in claim 5, characterized in that the moveable downstream section is shaped like a C and slides along longitudinal rails carried by the fixed structure of the aircraft.

13. In combination with an engine including a central body and an outer casing in which are produced a primary flux flow (hot) and a secondary flux flow (cold) by means of a fan for ejection through a singular annular duct provided between the central body and the casing, a thrust reverser for insuring deflection of substantially all of the flows created by the engine and the fan, said casing comprising a fixed forward section and a moveable downstream section which is axially moveable with respect to the central body and said thrust reverser including means for producing a thrust inversion comprising doors moveable from a first, inactive position to a second, thrust reversal position in which the doors extend radially with respect to the annular duct so as to close off the duct and extend outwardly with respect to the casing so as to create a passage in the casing which allows the flux to be deflected radially towards the outside of the annular duct and upstream thereof, said doors forming an intermediate section of the casing which is located between said fixed forward section and said moveable downstream section and which, in the first, inactive position thereof, is co-planar with said upstream and downstream sections; exterior links for joining said doors to said downstream section of said casing; beams forming extensions of said fixed upstream section of said casing and disposed laterally with respect to said doors; fixed axes formed integrally with said beams about which said doors pivot between said inactive position and said thrust reversal position; and control means for moving said downstream section of said casing and comprising jacks which are housed in said beam and which extend between said fixed upstream section and said moveable downstream section such that the action of said jacks directly causes the axial movement of said moveable downstream section and, consequently, the pivoting of said doors to said second, thrust reversal position thereof, solely by means of the force exerted by said moveable sections on said links and such that said jacks are permanently disposed outside of the thrust inversion flux.

* * * * *